(12) United States Patent
Matsumoto

(10) Patent No.: US 8,311,691 B2
(45) Date of Patent: Nov. 13, 2012

(54) CONTROL DEVICE FOR MOBILE UNIT

(75) Inventor: Katsunari Matsumoto, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 803 days.

(21) Appl. No.: 12/310,280

(22) PCT Filed: Sep. 8, 2006

(86) PCT No.: PCT/JP2006/318327
§ 371 (c)(1),
(2), (4) Date: Feb. 19, 2009

(87) PCT Pub. No.: WO2008/029489
PCT Pub. Date: Mar. 13, 2008

(65) Prior Publication Data
US 2009/0198397 A1    Aug. 6, 2009

(51) Int. Cl.
*G06F 17/00* (2006.01)

(52) U.S. Cl. .............. 701/22; 701/51; 701/56; 340/626; 318/481; 477/28; 477/45; 477/49; 417/12; 417/44.1; 417/44.2; 417/44.3; 165/42; 165/43

(58) Field of Classification Search .............. 701/22, 701/51, 56; 417/12, 44.1, 44.2, 44.3; 165/42, 165/43; 123/478, 492, 677, 480, 564, 568.27, 123/585; 477/28, 45, 49; 261/26; 474/28; 200/61.25; 318/481; 307/118; 340/626

See application file for complete search history.

(56) References Cited

U.S. PATENT DOCUMENTS

| 6,101,998 | A | * | 8/2000 | Tamura et al. | 123/295 |
| 6,166,449 | A | | 12/2000 | Takaoka et al. | |
| 6,859,708 | B2 | * | 2/2005 | Hashimoto et al. | 701/48 |
| 6,915,782 | B2 | * | 7/2005 | Hanada et al. | 123/399 |
| 2002/0175010 | A1 | | 11/2002 | Kobayashi et al. | |

FOREIGN PATENT DOCUMENTS

| JP | A-10-150701 | 6/1998 |
| JP | A-2000-88091 | 3/2000 |
| JP | A-2002-352833 | 12/2002 |
| JP | A-2004-208409 | 7/2004 |
| JP | A-2006-183523 | 7/2006 |
| JP | A-2006-288153 | 10/2006 |
| JP | A-2006-288170 | 10/2006 |

* cited by examiner

*Primary Examiner* — James Trammell
*Assistant Examiner* — McDieunel Marc
(74) *Attorney, Agent, or Firm* — Oliff & Berridge, PLC

(57) ABSTRACT

An HV-ECU performs a step of detecting an atmospheric pressure, a step of calculating a maximum value of a boost voltage corresponding to the atmospheric pressure by using a map, and a step of setting the maximum value as a system voltage value and controlling a DC/DC converter. Moreover, the HV-ECU may calculate a resistance value of a gate resistance of a switching element corresponding to the atmospheric pressure by using the map and control the gate resistance to achieve the set resistance value.

15 Claims, 6 Drawing Sheets

FIG. 9

| | PERFORMANCE AND EFFICIENCY OF MOTOR | EFFICIENCY OF INVERTER | MACHINE VERSATILITY AND COST |
|---|---|---|---|
| DECREASE SYSTEM VOLTAGE | × : DECREASE | ○ | × : BOOST SYSTEM IS REQUIRED |
| INCREASE GATE RESISTANCE | ○ | × : DECREASE | ○ |

CONTROL DEVICE FOR MOBILE UNIT

TECHNICAL FIELD

The present invention relates to a control device for a mobile unit, and in particular, to a control device controlling a motor and electrical equipment mounted on a mobile unit in accordance with an atmospheric pressure.

BACKGROUND ART

In recent years, a hybrid vehicle, a fuel cell vehicle, an electric vehicle and the like that run by using a driving force from a motor are attracting attention as one of the measures against environmental issues. On these vehicles, electrical equipment such as an inverter circuit supplying electric power to the motor is mounted. The electrical equipment drives the motor at high voltage, and it is necessary to ensure insulation. As a vehicle having such electrical equipment and motor mounted thereon, Japanese Patent Laying-Open No. 2004-208409, for example, discloses a vehicle on which a vehicle power control device capable of reducing a loss while responding excellently to various operating modes required by various rotating electric machines for running is mounted.

A vehicle having a motor mounted thereon may run in a highland. In particular, the atmospheric pressure is low in the highland, and discharge is likely to occur under such an environment. This characteristic is mentioned by the Paschen's law. The Paschen's law indicates that a discharge inception voltage is determined by a function of the product of the atmospheric pressure and the distance between electrodes. Therefore, in the electrical equipment and the motor, an amount of partial discharge within insulators is increased. As the amount of partial discharge is increased, the insulation performance of the insulators is degraded. Furthermore, the durability life is shortened.

Since a change in atmospheric pressure is not taken into consideration in the vehicle power control device disclosed in the above publication, the problems described above may arise.

DISCLOSURE OF THE INVENTION

An object of the present invention is to provide a control device for a mobile unit in which the insulation performance is ensured in accordance with a change in atmospheric pressure.

A control device for a mobile unit according to an aspect of the present invention is directed to a control device for a mobile unit having a motor mounted. Electrical equipment supplying electric power to the motor is mounted on the mobile unit. The control device includes a detecting unit detecting an atmospheric pressure, and a control unit controlling the motor. The control unit sets a voltage value that is to be supplied to the motor and the electrical equipment, in accordance with the detected atmospheric pressure, and controls the motor based on the set voltage value.

According to the present invention, the control unit sets a voltage value that is to be supplied to the motor and the electrical equipment, in accordance with the detected atmospheric pressure. The control unit controls the motor based on the set voltage value. For example, the control unit sets a voltage value that is to be supplied to the motor and the electrical equipment such that an amount of partial discharge falls within a permissible range where acceleration of degradation in the insulation performance of insulators can be suppressed at the detected atmospheric pressure. That is, the voltage value at which the amount of partial discharge falls within the permissible range is set under an environment where the atmospheric pressure is relatively low, such as in a highland, (for example, the voltage value lower than a voltage value at normal atmospheric pressure is set), so that an increase in amount of partial discharge can be suppressed. As a result, deterioration in the insulation performance of the insulators located within the motor and the electrical equipment can be suppressed. Therefore, there can be provided a control device for a mobile unit in which the insulation performance is ensured in accordance with a change in atmospheric pressure.

A control device for a mobile unit according to another aspect of the present invention is directed to a control device for a mobile unit having a motor mounted. The control device includes a detecting unit detecting an atmospheric pressure, and a control unit controlling the motor. The control unit sets a control value related to control of the motor in accordance with the detected atmospheric pressure, and controls the motor based on the set control value.

According to the present invention, the control unit sets a control value related to control of the motor (for example, a resistance value of a gate resistance provided between a switching element and a driving circuit in an inverter) in accordance with the detected atmospheric pressure. The control unit controls the motor based on the set control value. For example, the control unit sets a control value related to control of the motor such that an amount of partial discharge falls within a permissible range where acceleration of degradation in the insulation performance of insulators can be suppressed at the detected atmospheric pressure. That is, the control value at which the amount of partial discharge falls within the permissible range is set under an environment where the atmospheric pressure is relatively low, such as in a highland, (for example, the resistance value larger than a resistance value of the gate resistance at normal atmospheric pressure is set), so that an increase in amount of partial discharge can be suppressed. As a result, deterioration in the insulation performance of the insulators located within the motor and the electrical equipment can be suppressed. Therefore, there can be provided a control device for a mobile unit in which the insulation performance is ensured in accordance with a change in atmospheric pressure.

Preferably, an inverter supplying electric power to the motor is mounted on the mobile unit. The inverter includes a switching element and a driving circuit opening and closing the switching element. The control value is a resistance value of a gate resistance provided between the switching element and the driving circuit.

According to the present invention, the control value is a resistance value of a gate resistance provided between the switching element and the driving circuit. For example, if a resistance value larger than the resistance value of the gate resistance at normal atmospheric pressure is set under the environment where the atmospheric pressure is relatively low, such as in the highland, rising of a switching voltage is moderated. Consequently, a peak value of a surge voltage can be reduced. As a result, a reduction in the peak value of the surge voltage allows suppression of an increase in amount of partial discharge. Therefore, deterioration in the insulation performance of the insulators located within the motor and the electrical equipment can be suppressed.

More preferably, electrical equipment supplying electric power to the motor is mounted on the mobile unit. The control unit sets any one of a voltage value that is to be supplied to the motor and the electrical equipment and the resistance value, depending on a condition of the motor.

According to the present invention, in the case where the load required at the motor is low, for example, the voltage value of a system voltage that is to be supplied to the motor and the electrical equipment is set to be low, so that deterioration in the efficiency of the inverter can be suppressed and the insulation performance can be ensured. On the other hand, in the case where the load required at the motor is high, the resistance value of the gate resistance in the inverter is set to be large, so that deterioration in the performance and efficiency of the motor can be suppressed and the insulation performance can be ensured. Therefore, any one of the voltage value and the resistance value is set, so that deterioration in the insulation performance can be suppressed and the motor can be controlled in accordance with the required load.

BRIEF DESCRIPTION OF THE DRAWINGS

FIG. 9 shows the relationship between a change in voltage value and resistance value and the efficiency of a motor, the efficiency of an inverter and the cost.

BEST MODES FOR CARRYING OUT THE INVENTION

Figure 1:
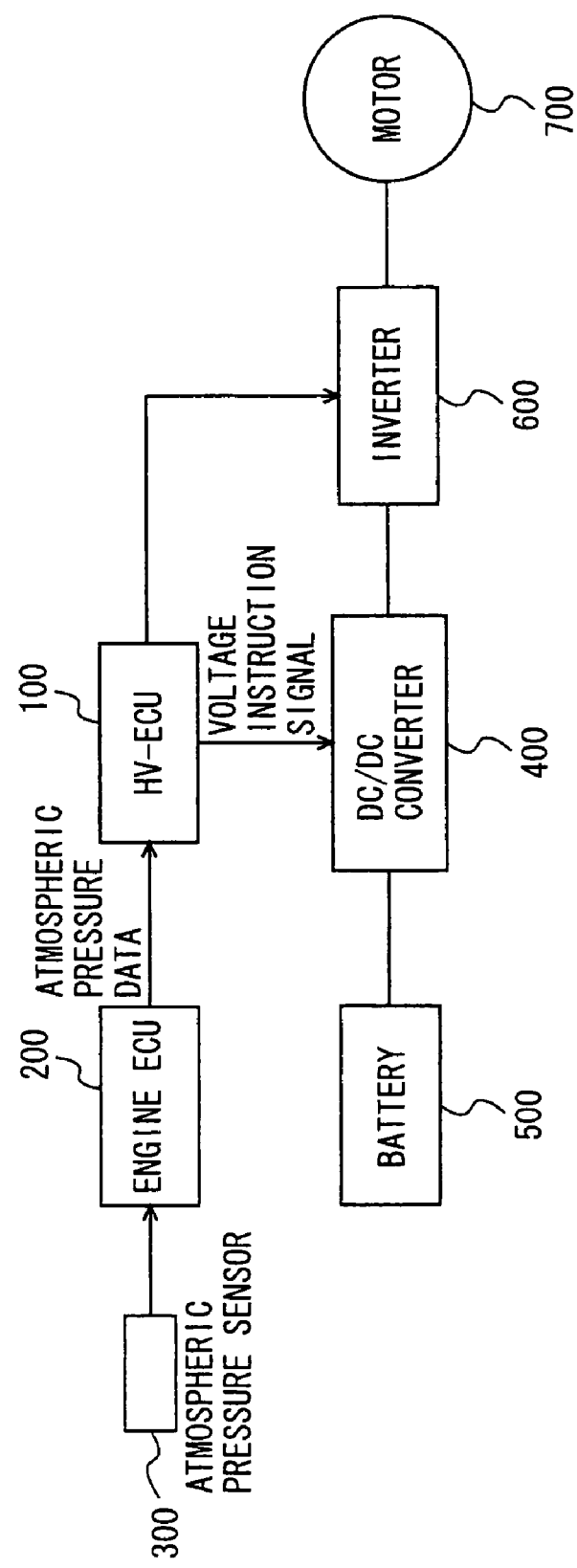
FIG. 1 shows a configuration of a vehicle having a vehicle control device according to a first embodiment mounted thereon.

A control device for a mobile unit according to embodiments of the present invention will be described hereinafter with reference to the drawings. In the following description, the same parts are represented by the same reference characters. The names and the functions are also the same. Therefore, the detailed description of those will not be repeated. It should be noted that, in the present invention, the mobile unit is not limited in particular, as long as the mobile unit has a motor mounted thereon. The mobile unit may be a hybrid vehicle, an electric vehicle or a fuel cell vehicle. In the present embodiments, the mobile unit is illustrated as a hybrid vehicle.

<First Embodiment>

As shown in FIG. 1, a vehicle on which a control device for a mobile unit according to the present embodiment is mounted has an HV-ECU (Hybrid Vehicle-Electronic Control Unit) 100, an engine ECU 200, a DC/DC converter 400, a battery 500, an inverter 600, and a motor 700 mounted thereon. It should be noted that the vehicle control device according to the present embodiment is implemented by a program executed in HV-ECU 100.

Battery 500 is not limited in particular, as long as battery 500 is a chargeable secondary battery. Battery 500 may be, for example, a nickel hydride battery or a lithium ion battery.

DC/DC converter 400 boosts a DC voltage of battery 500. DC/DC converter 400 controls a boost voltage in response to a control signal received from HV-ECU 100.

Inverter 600 converts the DC voltage boosted at DC/DC converter 400 to an AC voltage. Inverter 600 controls the AC voltage to be supplied to motor 700, in response to a control signal received from HV-ECU 100.

Motor 700 is an electric motor and is driven based on the AC voltage supplied from inverter 600. Motor 700 is, for example, a three-phase AC synchronous motor. Motor 700 is coupled to drive wheels (not shown) of the vehicle and causes the drive wheels to generate a driving force corresponding to the supplied AC voltage.

Engine ECU 200 controls an output of an engine (not shown) based on various information (for example, an accelerator position, an amount of intake air and the like) detected by various sensors. Engine ECU 200 is connected to be capable of communicating with HV-ECU 100. Furthermore, engine ECU 200 has an atmospheric pressure sensor 300 connected thereto. Atmospheric pressure sensor 300 is a sensor that detects an atmospheric pressure around the vehicle. Atmospheric pressure sensor 300 transmits a detection signal corresponding to the detected atmospheric pressure to engine ECU 200. It should be noted that a well-known art may be used as atmospheric pressure sensor 300, and therefore, the detailed description thereof will not be given.

Figure 2:
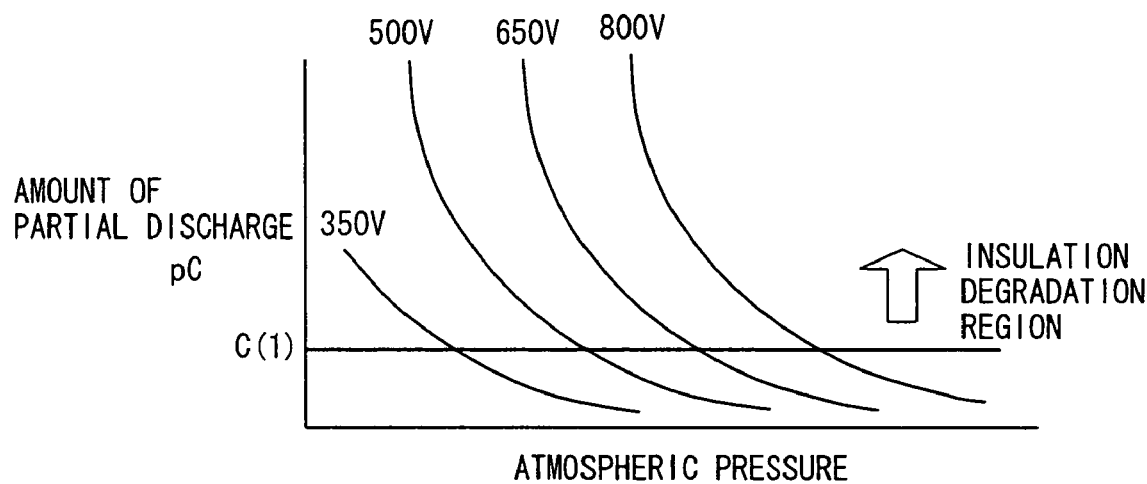
FIG. 2 shows the relationship between an atmospheric pressure and an amount of partial discharge.

When the vehicle runs, partial discharge occurs at internal insulators in accordance with actuation of DC/DC converter 400, inverter 600 and motor 700. An amount of this partial discharge is increased or decreased corresponding to a change in atmospheric pressure. That is, as shown in FIG. 2, the relationship between an atmospheric pressure and an amount of partial discharge is such that the amount of partial discharge is likely to increase as the atmospheric pressure is decreased. Furthermore, the amount of partial discharge is likely to increase as a DC voltage supplied to inverter 600 rises. In particular, a region where the amount of partial discharge exceeds C(1) is a region where degradation in the insulation performance of the internal insulators is accelerated. That is, in the case where the vehicle runs under an environment where the atmospheric pressure is low, such as in a highland, the insulation performance of the insulators located within DC/DC converter 400, inverter 600 and motor 700 can be degraded due to such an increase in amount of partial discharge.

Therefore, the present embodiment is characterized in that HV-ECU 100 sets a voltage value that is to be supplied to inverter 600 and motor 700, in accordance with the atmospheric pressure detected by atmospheric pressure sensor 300, and controls motor 700 based on the set voltage value.

Figure 3:
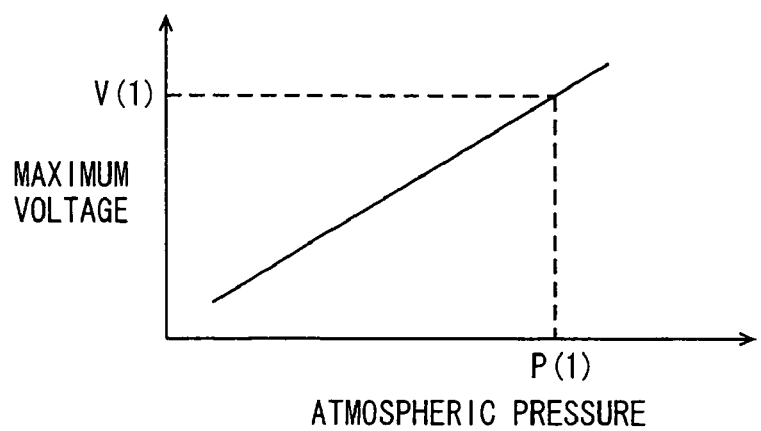
FIG. 3 shows the relationship between an atmospheric pressure and a permissible maximum value of a boost voltage.

Specifically, in HV-ECU 100, a map created based on the relationship between an atmospheric pressure and an amount of partial discharge as shown in FIG. 2 and showing the relationship between an atmospheric pressure and a permissible maximum voltage value as shown in FIG. 3 is stored in memory and the like in advance. In HV-ECU 100, for example, a map showing the relationship between an atmospheric pressure and a voltage value within a range where an amount of partial discharge does not exceed C(1) at the atmospheric pressure is stored in memory and the like in advance. HV-ECU 100 sets a maximum voltage value corresponding to the atmospheric pressure detected by atmospheric pressure sensor 300 as a maximum value of the boost voltage output at DC/DC converter 400, that is, a system voltage value. Then, HV-ECU 100 transmits the control signal to DC/DC converter 400 to achieve the set system voltage value.

Figure 4:
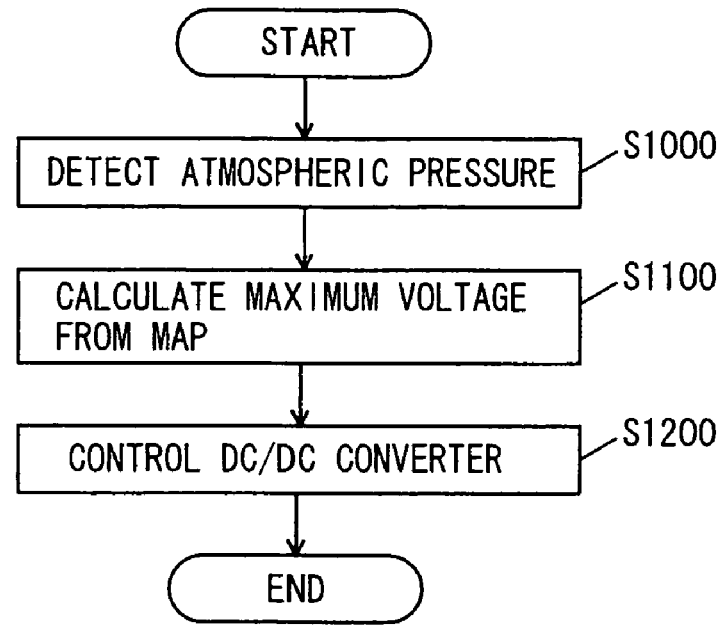
FIG. 4 is a flowchart of a control structure of a program executed in an HV-ECU that is the vehicle control device according to the first embodiment.

A control structure of a program executed in HV-ECU 100 that is the vehicle control device according to the present embodiment will be described hereinafter with reference to FIG. 4.

In a step (steps are denoted as "S" hereinafter) 1000, HV-ECU 100 detects an atmospheric pressure. HV-ECU 100 detects an atmospheric pressure based on the detection signal received from atmospheric pressure sensor 300.

In an S1100, HV-ECU 100 calculates a maximum voltage value from the detected atmospheric pressure and the map. In an S1200, HV-ECU 100 sets the calculated maximum voltage value as a maximum value of the boost voltage and controls DC/DC converter 400.

An operation of HV-ECU 100 that is the vehicle control device according to the present embodiment based on the above structure and flowchart will be described.

In the case where the vehicle runs in the highland such as a mountain area, an atmospheric pressure is detected (S1000), and a maximum value V(1) of the boost voltage corresponding to the detected atmospheric pressure P(1) is calculated based on the map as shown in FIG. 3 (S1100). Since the detected atmospheric pressure is low in the highland, maximum value V(1) of the boost voltage is set to a value lower than a maximum value of the boost voltage at normal atmospheric pressure.

Calculated maximum value V(1) of the boost voltage is set and a voltage supplied from DC/DC converter 400 to inverter 600 is controlled (S1200). At this time, DC/DC converter 400 is controlled such that the voltage does not exceed set maximum value V(1) of the boost voltage.

As described above, in the control device for a mobile unit according to the present embodiment, the HV-ECU sets a voltage value that is to be supplied to the motor and the inverter, in accordance with the detected atmospheric pressure. The HV-ECU controls the motor based on the set voltage value. For example, the HV-ECU sets a voltage value that is to be supplied to the motor and the inverter such that the amount of partial discharge falls within a permissible range where acceleration of degradation in the insulation performance of the insulators can be suppressed at the detected atmospheric pressure. The voltage value at which the amount of partial discharge falls within the permissible range, that is, the voltage value lower than the voltage value at normal atmospheric pressure is set under the environment where the atmospheric pressure is relatively low, such as in the highland, so that an increase in amount of partial discharge can be suppressed. As a result, deterioration in the insulation performance of the insulators located within the motor and the inverter can be suppressed. Therefore, there can be provided a control device for a mobile unit in which the insulation performance is ensured in accordance with a change in atmospheric pressure.

<Second Embodiment>

A control device for a mobile unit according to a second embodiment will be described hereinafter. A vehicle having the control device for a mobile unit according to the present embodiment mounted thereon is different from the vehicle having the control device for a mobile unit according to the above-described first embodiment mounted thereon in terms of a configuration of inverter 600. The configuration of the vehicle having the control device for a mobile unit according to the present embodiment mounted thereon is otherwise the same as that of the vehicle having the control device for a mobile unit according to the above-described first embodiment mounted thereon. They are represented by the same reference characters. The functions are also the same. Therefore, the detailed description of those will not be repeated.

The present embodiment is characterized in that HV-ECU 100 sets a control value related to control of motor 700 in accordance with the atmospheric pressure detected by atmospheric pressure sensor 300, and controls motor 700 based on the set control value.

Specifically, in the present embodiment, inverter 600 includes a switching element 1100 corresponding to respective phases of motor 700, and a gate driving circuit 900. In inverter 600, in response to the control signal from HV-ECU 100, opening and closing of switching element 1100 are controlled by gate driving circuit 900 corresponding to respective phases, and a DC voltage is converted to an AC voltage. Switching element 1100 is, for example, an IGBT (Insulated Gate Bipolar Transistor).

Figure 5:
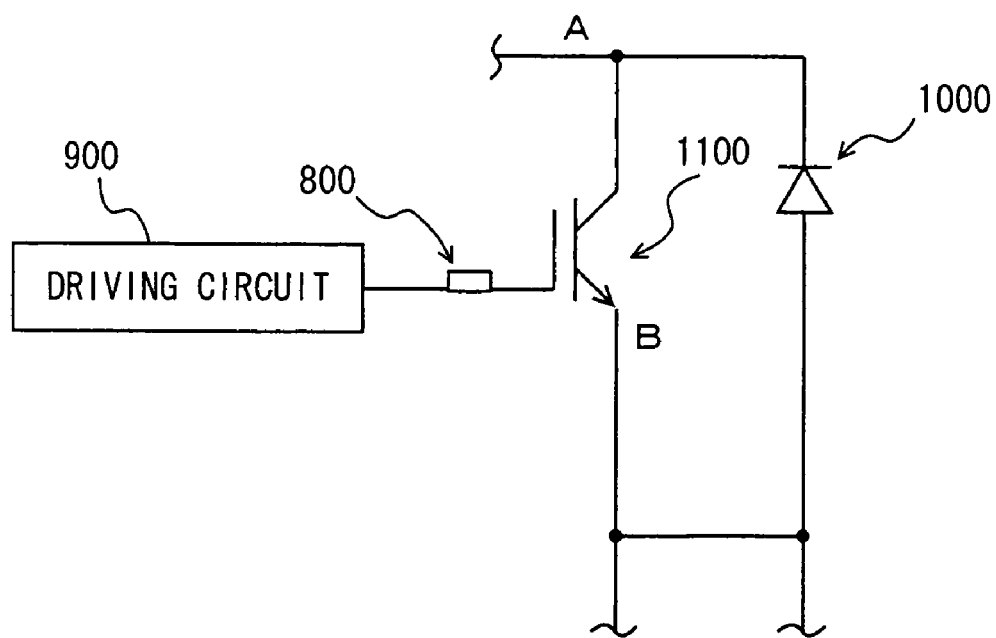
FIG. 5 shows a part of a configuration of an inverter in a second embodiment.

As shown in FIG. 5, an anti-parallel diode 1000 that causes a current to flow from the emitter side to the collector side is connected to switching element 1100. A gate resistance 800 is provided between the gate side of switching element 1100 and gate driving circuit 900. In response to the control signal from HV-ECU 100, a driving signal is output from gate driving circuit 900 to switching element 1000, and switching element 1100 opens and closes in response to the driving signal. Opening and closing of switching element 1100 corresponding to respective phases are controlled, so that a DC voltage of DC/DC converter 600 is converted to an AC voltage and the converted AC voltage is supplied to motor 700.

Figure 6:
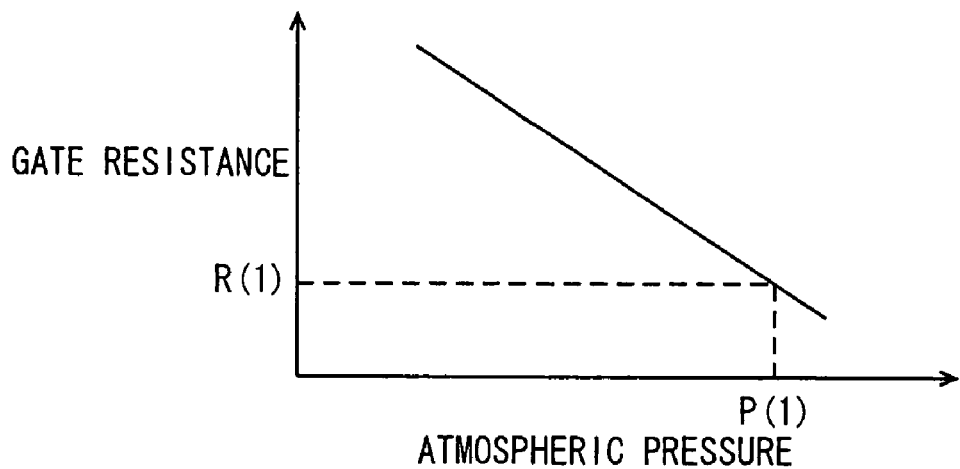
FIG. 6 shows the relationship between an atmospheric pressure and a permissible resistance value of a gate resistance.

In the present embodiment, gate resistance 800 is a variable resistor and a resistance value is variable in response to the control signal from HV-ECU 100. In the present embodiment, the control value is a resistance value of gate resistance 800, and HV-ECU 100 sets a resistance value of gate resistance 800 in accordance with the atmospheric pressure detected by atmospheric pressure sensor 300, and controls gate resistance 800 to achieve the set resistance value. That is, in HV-ECU 100, a map created based on the relationship between an atmospheric pressure and an amount of partial discharge as shown in FIG. 2 and showing the relationship between an atmospheric pressure and a permissible resistance value as shown in FIG. 6 is stored in the memory and the like in advance. HV-ECU 100 sets a resistance value R(1) corresponding to atmospheric pressure P(1) detected by atmospheric pressure sensor 300. Then, HV-ECU 100 transmits the control signal to gate resistance 800 to achieve set resistance value R(1).

Figure 7:
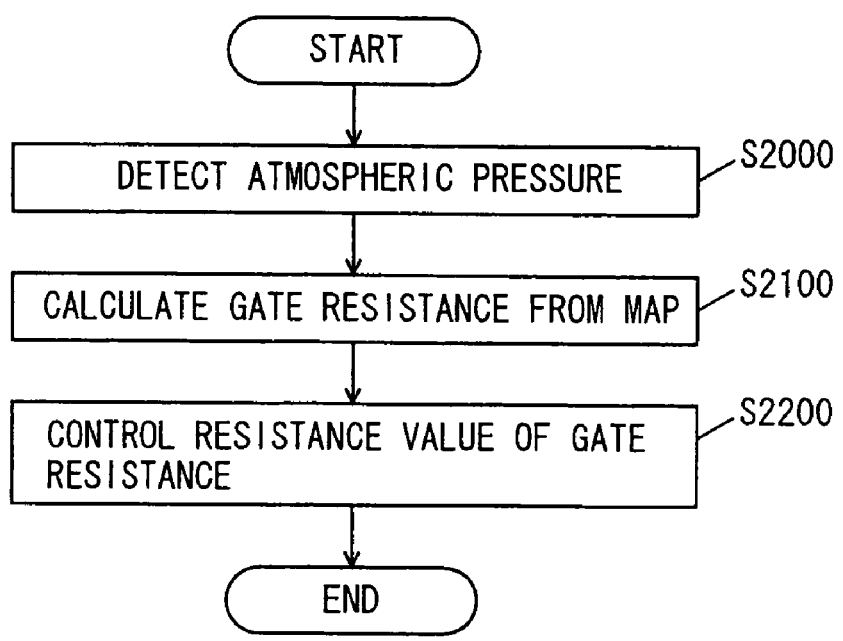
FIG. 7 is a flowchart of a control structure of a program executed in an HV-ECU that is a vehicle control device according to the second embodiment.

A control structure of a program executed in HV-ECU 100 that is the control device for a mobile unit according to the present embodiment will be described hereinafter with reference to FIG. 7.

In an S2000, HV-ECU 100 detects an atmospheric pressure. HV-ECU 100 detects an atmospheric pressure based on the detection signal received from atmospheric pressure sensor 300.

In an S2100, HV-ECU 100 calculates a resistance value from the detected atmospheric pressure and the map. In an S2200, HV-ECU 100 controls gate resistance 800 to achieve the calculated resistance value.

An operation of HV-ECU 100 that is the vehicle control device according to the present embodiment based on the above structure and flowchart will be described.

In the case where the vehicle runs in the highland such as a mountain area, an atmospheric pressure is detected (S2000), and resistance value R(1) corresponding to detected atmospheric pressure P(1) is calculated based on the map as shown in FIG. 6 (S2100). Since detected atmospheric pressure P(1)

is low in the highland, resistance value R(1) is set to a value larger than a resistance value at normal atmospheric pressure.

Figure 8A:
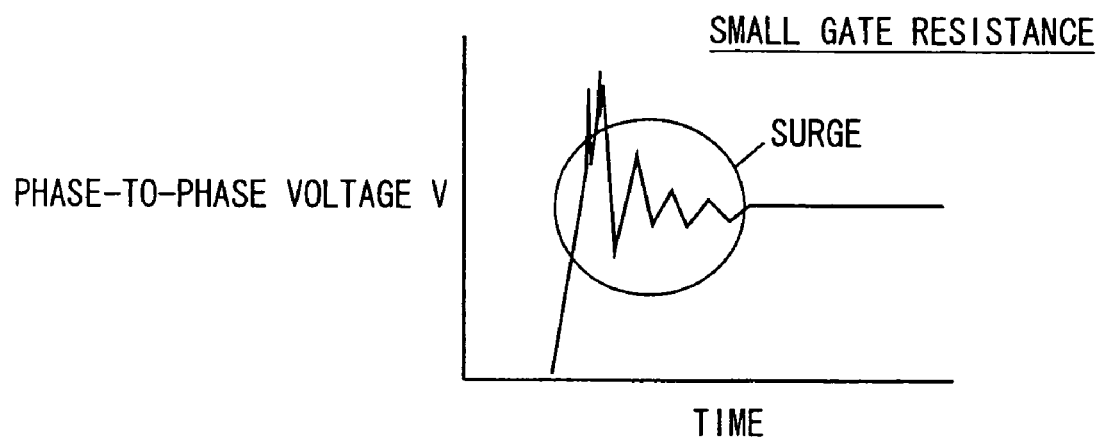
FIGS. 8A and 8B are timing charts showing a change in switching voltage between an emitter and a collector of a switching element.
Figure 8B:
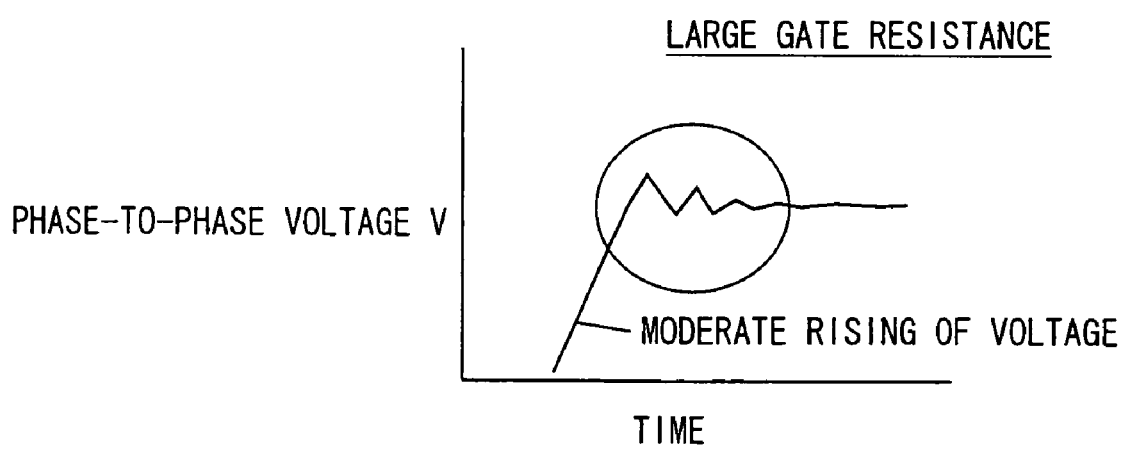

The resistance value of gate resistance 800 is controlled to be calculated resistance value R(1). At this time, as shown in FIG. 8A, when gate resistance 800 is set to be small, a surge voltage is increased and a maximum value of the switching voltage between the emitter and the collector is increased. On the other hand, as shown in FIG. 8B, when gate resistance 800 is set to be large, the surge voltage is decreased because of moderate rising of the switching voltage between the emitter and the collector. When the surge voltage is decreased, the maximum value of the switching voltage is reduced. Therefore, the amount of partial discharge generated at inverter 600 and motor 700 is suppressed.

As described above, in the control device for a mobile unit according to the present embodiment, the HV-ECU sets a resistance value of the gate resistance provided between the switching element and the driving circuit in the inverter such that the amount of partial discharge falls within a permissible range at the detected atmospheric pressure. The HV-ECU controls the motor based on the set resistance value. The HV-ECU sets a resistance value such that the amount of partial discharge falls within the permissible range where acceleration of degradation in the insulation performance of the insulators can be suppressed. That is, under the environment where the atmospheric pressure is relatively low, such as in the highland, the resistance value larger than the resistance value of the gate resistance at normal atmospheric pressure is set such that the amount of partial discharge falls within the permissible range, so that an increase in amount of partial discharge can be suppressed. As a result, deterioration in the insulation performance of the insulators located within the motor and the inverter can be suppressed. Therefore, there can be provided a control device for a mobile unit in which the insulation performance is ensured in accordance with a change in atmospheric pressure.

It is desirable that, depending on the condition of the motor, the HV-ECU preferably performs any one of control of the maximum value of the boost voltage in accordance with the atmospheric pressure that is described in the above first embodiment and control of the resistance value of the gate resistance in accordance with the atmospheric pressure that is described in the present embodiment.

As shown in FIG. 9, the maximum value of the boost voltage is reduced by the control of the maximum value of the boost voltage in accordance with the atmospheric pressure that is described in the above first embodiment. Therefore, the performance and efficiency of the motor may be deteriorated, while deterioration in the efficiency of the inverter can be suppressed. Furthermore, the DC/DC converter is required to control the boost voltage.

On the other hand, the resistance value of the gate resistance is increased by the control of the resistance value of the gate resistance in accordance with the atmospheric pressure that is described in the present embodiment. Therefore, the efficiency of the inverter may be deteriorated, while deterioration in the performance and efficiency of the motor can be suppressed. Furthermore, a boost system such as the DC/DC converter is unnecessary to control the resistance value of the gate resistance.

Therefore, in the case where the load required at the motor is low under the environment where the atmospheric pressure is low, the maximum value of the boost voltage is set to be low, so that deterioration in the efficiency of the inverter can be suppressed and the insulation performance can be ensured. On the other hand, in the case where the load required at the motor is high, the resistance value of the gate resistance in the inverter is set to be large, so that deterioration in the performance and efficiency of the motor can be suppressed and the insulation performance can be ensured. Therefore, any one of the voltage value and the resistance value is set in accordance with the load required at the motor, so that deterioration in the insulation performance can be suppressed and the motor can be controlled in accordance with the required load.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

The invention claimed is:

1. A control device for a mobile unit having a motor mounted, electrical equipment supplying electric power to said motor being mounted on said mobile unit, the control device comprising:
   a detecting unit detecting an atmospheric pressure; and
   a control unit controlling said motor,
      said control unit setting a maximum value of a voltage that is to be supplied to said motor and said electrical equipment so as to be reduced in accordance with a reduction in said detected atmospheric pressure, and
      controlling said motor based on said set maximum value.

2. The control device for a mobile unit according to claim 1, wherein said control unit is configured to set said maximum value of the voltage such that an amount of partial discharge within an insulator of said motor is within a permissible range based on an environment comprising said detected atmospheric pressure.

3. A control device for a mobile unit having a motor mounted, comprising:
   a detecting unit detecting an atmospheric pressure; and
   a control unit controlling said motor,
      said control unit setting a control value related to control of said motor in accordance with said detected atmospheric pressure, and
      controlling said motor based on said set control value, an inverter supplying electric power to said motor being mounted on said mobile unit,
      said inverter including a switching element and a driving circuit opening and closing said switching element, and
      said control value being a resistance value of a gate resistance provided between said switching element and said driving circuit.

4. The control device for a mobile unit according to claim 2, wherein electrical equipment supplying electric power to said motor is mounted on said mobile unit, and
   said control unit sets any one of a voltage value that is to be supplied to said motor and said electrical equipment and said resistance value, depending on a condition of said motor.

5. A control device for a mobile unit having a motor mounted, electrical equipment supplying electric power to said motor being mounted on said mobile unit, the control device comprising:
   means for detecting an atmospheric pressure; and
   control means for controlling said motor,
      said control means including
         means for setting a maximum value of a voltage that is to be supplied to said motor and said electrical equipment so as to be reduced in accordance with a reduction in said detected atmospheric pressure, and
         means for controlling said motor based on said set maximum value.

6. The control device for a mobile unit according to claim 5, wherein said means for setting said maximum value of the voltage is configured to set said maximum voltage such that an amount of partial discharge within an insulator of said motor is within a permissible range based on an environment comprising said detected atmospheric pressure.

7. A control device for a mobile unit having a motor mounted, comprising:
means for detecting an atmospheric pressure; and
control means for controlling said motor,
said control means including
setting means for setting a control value related to control of said motor in accordance with said detected atmospheric pressure, and
means for controlling said motor based on said set control value, an inverter supplying electric power to said motor being mounted on said mobile unit,
said inverter including a switching element and a driving circuit opening and closing said switching element, and
said control value being a resistance value of a gate resistance provided between said switching element and said driving circuit.

8. The control device for a mobile unit according to claim 7, wherein
electrical equipment supplying electric power to said motor is mounted on said mobile unit, and
said setting means includes means for setting any one of a voltage value that is to be supplied to said motor and said electrical equipment and said resistance value, depending on a condition of said motor.

9. A method for controlling a mobile unit having a motor mounted, electrical equipment supplying electric power to said motor being mounted on said mobile unit, the method comprising the steps of:
detecting an atmospheric pressure; and
controlling said motor, said step of controlling said motor including the steps of:
setting by an electronic control unit a maximum value of a voltage that is to be supplied to said motor and said electrical equipment so as to be reduced in accordance with a reduction in said detected atmospheric pressure; and
controlling said motor based on said set maximum value.

10. The control device for a mobile unit according to claim 9, wherein the step of setting by an electronic control unit a maximum value of the voltage includes setting said maximum value such that an amount of partial discharge within an insulator of said motor is within a permissible range based on an environment comprising said detected atmospheric pressure.

11. A method for controlling a mobile unit having a motor mounted, comprising the steps of:
detecting an atmospheric pressure; and
controlling said motor, said step of controlling said motor including the steps of:
setting by an electronic control unit a control value related to control of said motor in accordance with said detected atmospheric pressure; and
controlling said motor based on said set control value,
an inverter supplying electric power to said motor being mounted on said mobile unit,
said inverter including a switching element and a driving circuit opening and closing said switching element, and
said control value being a resistance value of a gate resistance provided between said switching element and said driving circuit.

12. The method for controlling a mobile unit according to claim 11, wherein
electrical equipment supplying electric power to said motor is mounted on said mobile unit, and
said step of setting by an electronic control unit a control value includes a step of setting any one of a voltage value that is to be supplied to said motor and said electrical equipment and said resistance value, depending on a condition of said motor.

13. A control device for a mobile unit having a motor mounted, an inverter supplying electric power to said motor being mounted on said mobile unit, the control device comprising:
an atmospheric pressure sensor detecting an atmospheric pressure; and
an electronic control unit controlling said motor, said electronic control unit
setting a maximum value of a voltage that is to be supplied to said motor and said inverter so as to be reduced in accordance with a reduction in said detected atmospheric pressure, and
controlling said motor based on said set maximum value.

14. The control device for a mobile unit according to claim 13, wherein said electronic control unit is configured to set said maximum value of the voltage such that an amount of partial discharge within an insulator of said motor is within a permissible range based on an environment comprising said detected atmospheric pressure.

15. A control device for a mobile unit having a motor mounted, comprising:
an atmospheric pressure sensor detecting an atmospheric pressure; and
an electronic control unit controlling said motor, said electronic control unit
setting a control value related to control of said motor in accordance with said detected atmospheric pressure, and
controlling said motor based on said set control value,
an inverter supplying electric power to said motor being mounted on said mobile unit, said inverter including a switching element and a driving circuit opening and closing said switching element, and
said control value being a resistance value of a gate resistance provided between said switching element and said driving circuit.

* * * * *